US010117090B2

(12) United States Patent
Jahangir et al.

(10) Patent No.: US 10,117,090 B2
(45) Date of Patent: Oct. 30, 2018

(54) MULTIPLE DEVICE ASSOCIATION WITH A SINGLE TELEPHONE NUMBER

(71) Applicant: T-Mobile USA, Inc., Bellevue, WA (US)

(72) Inventors: Zeeshan Jahangir, Bellevue, WA (US); Shujaur Rehman Mufti, Snoqualmie, WA (US); Sabuhi Kiran Zaifuddin, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/934,890

(22) Filed: Nov. 6, 2015

(65) Prior Publication Data

US 2016/0135139 A1 May 12, 2016

Related U.S. Application Data

(60) Provisional application No. 62/077,124, filed on Nov. 7, 2014.

(51) Int. Cl.
*H04W 4/00* (2018.01)
*H04W 8/18* (2009.01)
*H04L 29/06* (2006.01)

(52) U.S. Cl.
CPC ........... *H04W 8/18* (2013.01); *H04L 65/1016* (2013.01); *H04L 65/1046* (2013.01); *H04L 65/1063* (2013.01); *H04L 65/1073* (2013.01)

(58) Field of Classification Search
CPC .... H04W 60/005; H04W 8/18; H04L 67/303; H04L 65/1046; H04L 65/1016; H04L 65/1073; H04L 65/1063

(Continued)

(56) References Cited

U.S. PATENT DOCUMENTS 7,995,565 B2 * 8/2011 Buckley ............... H04L 12/66
370/353
8,116,729 B2 * 2/2012 Chow ............... G06Q 30/0283
379/114.03

(Continued)

FOREIGN PATENT DOCUMENTS

WO 2013135268 A1 9/2013

OTHER PUBLICATIONS

"International Search Report and Written Opinion" for PCT/US2015/059593, dated Mar. 31, 2016, 13 pages.

(Continued)

*Primary Examiner* — Marceau Milord
(74) *Attorney, Agent, or Firm* — Han Santos, PLLC

(57) ABSTRACT

Multiple user devices may be associated with a single telephone number to enable a user to initiate and receive communication via the single telephone number from any of the multiple user devices. An input is received at a service portal of a mobile telecommunication network. The input configures multiple user devices to share a common telephone number to initiate and receive communications. The input is stored as a device association profile in a device association data store that is accessible by a call session control function (CSCF) node of the mobile telecommunication network. The CSCF node then further determines based at least on the device association profile whether a user device is eligible to use the common telephone number to initiate and receive communications via the mobile telecommunication network.

20 Claims, 6 Drawing Sheets

(58) Field of Classification Search
USPC .................................................... 455/435.1
See application file for complete search history.

(56) References Cited

U.S. PATENT DOCUMENTS

| | | | | |
|---|---|---|---|---|
| 8,375,090 | B2* | 2/2013 | Cai ................... | H04L 65/1016 709/206 |
| 8,472,431 | B2* | 6/2013 | Siegel ................ | H04L 65/1016 370/352 |
| 8,488,596 | B2* | 7/2013 | Parlamas ........... | H04W 76/022 370/310.2 |
| 8,489,743 | B2* | 7/2013 | Astrom ............... | H04L 29/06 709/203 |
| 8,515,421 | B2* | 8/2013 | Shaheen ............. | H04W 8/06 455/435.1 |
| 8,793,388 | B2* | 7/2014 | Siegel ................ | H04L 65/1016 370/328 |
| 8,948,752 | B2* | 2/2015 | Siegel ................ | H04W 12/06 455/415 |
| 8,983,541 | B2* | 3/2015 | Ali ...................... | H04L 65/1073 455/558 |
| 9,036,590 | B2* | 5/2015 | Parlamas ........... | H04W 76/022 370/329 |
| 9,094,479 | B2* | 7/2015 | Patterson ........... | H04L 51/28 |
| 9,241,253 | B2* | 1/2016 | Siegel ................ | H04W 8/02 |
| 9,276,966 | B2* | 3/2016 | Tenenti .............. | H04L 65/1016 |
| 9,288,646 | B2* | 3/2016 | Ponukumati ........ | H04W 4/16 |
| 9,401,908 | B1* | 7/2016 | Gangadharan ...... | H04L 63/08 |
| 9,420,417 | B1* | 8/2016 | Agarwal ............. | H04W 4/02 |
| 9,451,421 | B1* | 9/2016 | Allen .................. | H04W 4/10 |
| 9,473,888 | B1* | 10/2016 | Agarwal ............. | H04W 4/021 |
| 9,794,769 | B2* | 10/2017 | Dubesset ............. | H04W 8/04 |
| 2009/0191870 | A1 | 7/2009 | Siegel et al. | |
| 2010/0311386 | A1* | 12/2010 | Edge .................. | H04W 36/0022 455/404.1 |
| 2011/0026440 | A1* | 2/2011 | Dunn .................. | H04M 3/5116 370/259 |
| 2011/0075658 | A1 | 3/2011 | Vergara et al. | |
| 2012/0036270 | A1 | 2/2012 | Bullon et al. | |
| 2015/0016420 | A1* | 1/2015 | Balabhadruni ...... | H04W 4/22 370/331 |
| 2016/0057607 | A1* | 2/2016 | Dubesset ............. | H04W 8/12 455/433 |
| 2016/0315938 | A1* | 10/2016 | Kunz .................. | H04L 65/1016 |

OTHER PUBLICATIONS

ETSI, '3GPP; TSGSSA; IP Multimedia Subsystem (IMS); Stage 2; (Release13),' 3GPP TS 23.228 V13.0.0, Sep. 22, 2014.

ETSI, '3GPP; TSGSSA; Study on enhancement to Web Real Time Communication (WebRTC) access to IP Multimedia Subsystem (IMS); Stage 2; (Release 13)' 3GPP TR 23.706 V0.1.1, Nov. 3, 2014.

Nokia Networks, 'Considerations on solution 1 supporting class of users,' S2-143360, 3GPP TSG-SA WG2 #105, Sapporo, Japan, Oct. 8, 2014.

Extended European Search Report for European Patent Application No. 15856986.3 dated Apr. 19, 2018, 8 pages.

\* cited by examiner

MULTIPLE DEVICE ASSOCIATION WITH A SINGLE TELEPHONE NUMBER

CROSS REFERENCE TO RELATED PATENT APPLICATION

This application claims priority to U.S. Provisional Patent Application No. 62/077,124, filed on Nov. 7, 2014, entitled "Multiple SIM Registration on a Single Implicit Registration Set," which is hereby incorporated by reference in its entirety.

BACKGROUND

Mobile telecommunication devices are integral to the daily lives of most users. Originally, mobile telecommunication devices simply provided two-way voice communication between two people at different locations. For example, a voice call normally involves real-time, duplex, synchronous voice communications, in which all participants hear the other participants in real time.

More recently, mobile telecommunication devices are also capable of providing data communication. Such data communication my include sending and receiving text and multimedia messages, access information and services provided by online service providers, as well as exchanging data with other nearby devices via short range communication. Accordingly, mobile telecommunication devices may be used to make voice calls, check email and text messages, update social media pages, stream media, browse websites, make point-of-sale payments, and/or so forth. Mobile telecommunication devices come in a myriad of form factors, such as tablets, feature phones, smart phones, smart watches, phablets, and/or so forth. Further, a user or the user's household often possesses multiple mobile telecommunication devices.

Nevertheless, despite these advances in mobile telecommunication, users who possess multiple telecommunication devices still face restrictions in the way they use their devices. Generally, users are not permitted to register multiple mobile telecommunication devices with a telecommunication carrier under a single public identity. For example, 3rd Generation Partnership Project (3GPP) Technical Specification (TS) 23.228, which governs telecommunication carriers that operate third-generation (3G) telecommunication networks, explicitly stipulates that all Public User Identities of an Implicit Registration Set (IRS) are to be associated to the same Private User Identities. As a result, the user is unable to make and receive voice calls at any one of multiple devices using a single Mobile Station International Subscriber Directory Number (MSISDN), also commonly known as a telephone number. Instead, a user desiring to use multiple devices for telecommunication is often forced to purchase a separate line of service from the telecommunication carrier for each device, in which each line is associated with a different telephone number.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
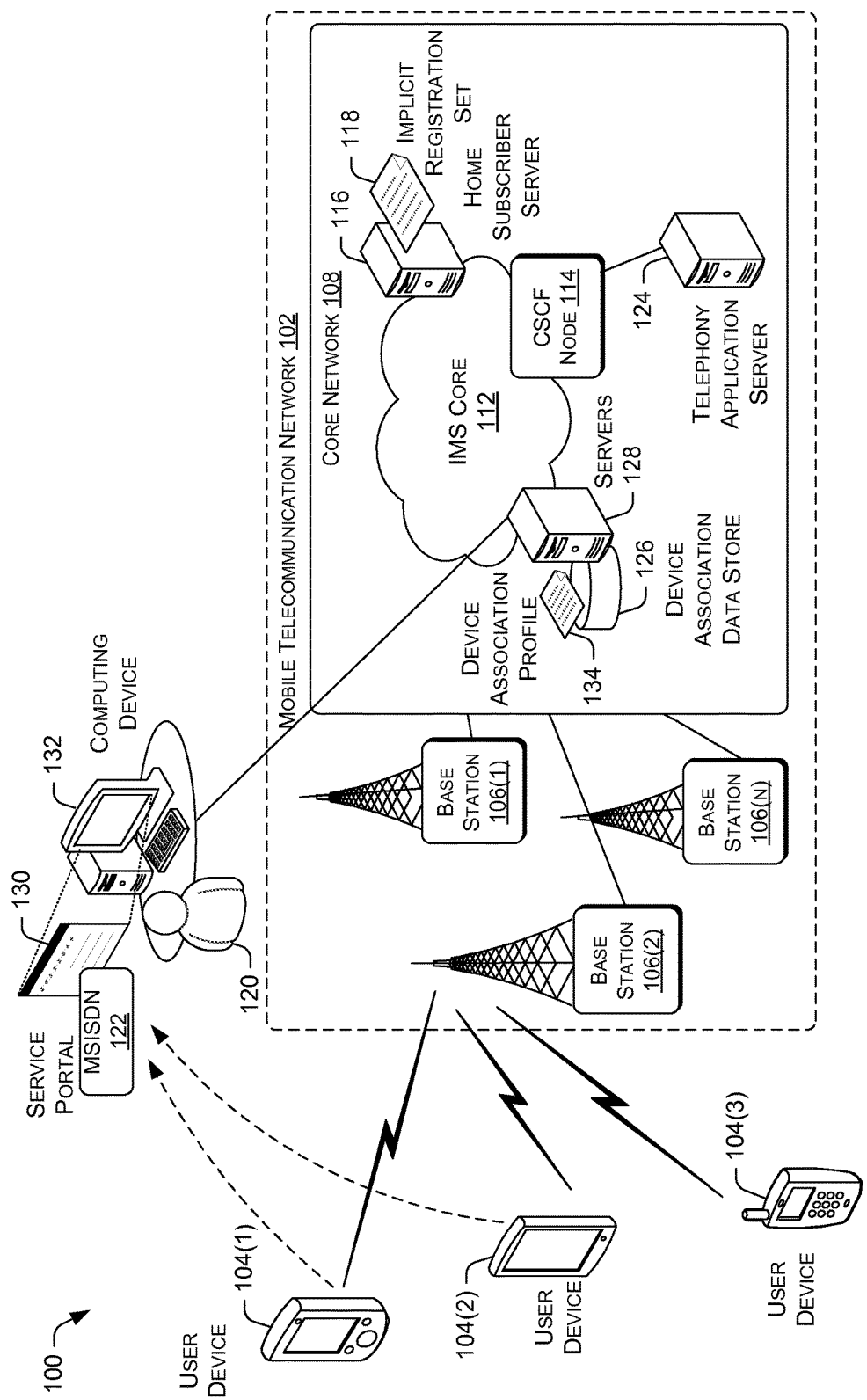
FIG. 1 illustrates an example architecture for implementing multiple device association with a single telephone number such that the multiple devices may use the single telephone number to initiate and receive communications.

This disclosure is directed to techniques for associating multiple user devices with a single telephone number that is provided by a mobile telecommunication network. The user devices may include Subscriber Identity Module (SIM)-equipped mobile telecommunication devices, mobile telecommunication devices that do not use SIMs, and/or other types of networked devices. The association of the multiple user devices with a single telephone number may enable a user of the multiple user devices to initiate and receiving communications that are routed via the single telephone number. The communications may include voice calls, text messages, multimedia messages, web data transfers, network data transfers, and/or so forth. In various embodiments, a user may use a service portal provided by the mobile telecommunication network to select user devices that are to be associated with a telephone number. The user devices may be selected for association via the IP Multimedia Private Identities (IMPIs) of the user devices. The IMPI of a user device may be a device identifier that uniquely identifies the user device, such as an International Mobile Station Equipment Identity (IMEI), a Mobile Equipment Identifier (MEID), or some other electronic serial number (ESN) of the user device.

Once the user devices are selected for association, a control function of the mobile telecommunication network, such as the Call Session Control Function (CSCF) node, may register the selected user devices to use the common telephone number. In various embodiments, the CSCF node may include a Serving CSCF (S-CSCF) and an interrogating CSCF (I-CSCF) in the IP Multimedia Subsystem (IMS) of the mobile telecommunication network. The CSCF node may identify the selected user devices based on a registry of user devices of the user, e.g., the Implicit Registration Set (IRS), stored in a user information server of the mobile telecommunication network. For example, the server may be the Home Subscriber Server (HSS) of the mobile telecommunication network.

The user devices that are registered by the CSCF node of the mobile telecommunication network may be able to use the common telephone number to initiate and receive communication. For example, two mobile telecommunication devices registered in this manner may both ring when there is an incoming voice call for the common telephone number.

In another example, a user may use one of multiple mobile telecommunication devices registered in this manner to send an outgoing text message to a message recipient. In contrast, user devices listed in the IRS but which are not registered by the CSCF node of the mobile telecommunication network will not be able to initiate and receive communication that are routed via the common telephone number.

The ability to associate multiple user devices with a single telephone number may enable a user to initiate and receive communication via a single telephone number from any of the multiple user devices. Such ability may provide additional convenience to the user of the multiple user devices. For example, if the user inadvertently leaves a mobile telecommunication device at home while traveling abroad, the user may simply associate another mobile telecommunication device with the same telephone number. As such, the user may still initiate and receive communication at the same telephone number using the different device without purchasing another SIM card or order another line of service from an existing mobile telecommunication carrier. In another example, a user that desires to use different user devices for different events and occasions while using the same telephone number may do so without having to seek assistance from customer care or swap a SIM card between the different user devices. The techniques described herein may be implemented in a number of ways. Example implementations are provided below with reference to the following FIGS. 1-6.

Example Architecture

FIG. 1 illustrates an example architecture 100 for implementing multiple device association with a single telephone number such that the multiple devices may use the single telephone number to initiate and receive communications. The architecture 100 may include a mobile telecommunication network 102 and user devices 104(1)-104(3). The user device 104 may be a feature phone, a smartphone, a tablet computer, a phablet, an embedded computer system, or any other device that is capable of using the wireless communication services that are provided by the mobile telecommunication network 102. The mobile telecommunication network 102 may include base stations 106(1)-106(N) and a core network 108. The mobile telecommunication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The base stations 106(1)-106(N) are responsible handling voice and data traffic between user devices 104(1)-104(3) and the core network 108. In some embodiments, the base stations may be in the form of eNodeB nodes. Each eNodeB node may include a base transceiver system (BTS) that communicates via an antennae system over an air-link with one or more user devices that are within range. The antenna system of an eNodeB node may include multiple antennae that are mounted on a radio tower to provide a coverage area that is referred to as a "cell." The BTS may send RF signals to user devices and receive radio signals from user devices.

The core network 108 may provide telecommunication and data communication services to multiple user devices. For example, the core network 108 may connect the user devices 104(1)-104(3) to other telecommunication and data communication networks, such as the Internet 110 and the public switched telephone network (PSTN). Accordingly, packet communications via the core network 108 and the Internet may support a variety of services. In various embodiments, an IMS core 112 may reside in the core network 108 of the mobile telecommunication network 102. The IMS core 112 may include a CSCF node 114 and the HSS 116. However, in case of a 3G network environment, the HSS 116 may be substituted with an equivalent home subscriber information database in the form of a Home Location Register (HLR). The CSCF node 114 may handle Session Initiation Protocol (SIP) sessions, which are communication sessions for packet-based voice and video calls, instant messaging over IP networks, and/or so forth. The CSCF node 114 may include a proxy CSCF (P-CSCF), an interrogating CSCF (I-CSCF), and a Serving CSCF (S-CSCF). The P-CSCF may route incoming SIP messages to an IMS registrar server. The P-CSCF may also safeguard the security of the IMS core 112 by handling Internet Protocol Security (IPSec) for communications that exchanged by the user devices 104(1)-104(3). In some alternative instances, instead of SIP sessions, the P-CSCF may handle Remote Authentication Dial-In User Service (RADIUS) sessions.

The I-CSCF may be an inbound SIP proxy server of the IMS core 112. During IMS registration of a user device, the I-CSCF may query the HSS 116 to designate an S-CSCF to service the user device. The I-CSCF may be further responsible for routing incoming IMS session requests and terminating IMS sessions requests. The S-CSCF may perform registration and redirection of user devices. The S-CSCF may route session requests that originated from user devices and are terminated by user devices. The HSS 116 may be a master user database that supports the functions of the IMS core 112 in handling calls and/or sessions. The HSS 116 may contain user profiles that are used to perform authentication and authorization of network subscribers and user devices. Accordingly, the HSS 116 may store the IRSs of users, such as the IRS 118 of a user 120. Each IRS may include an IMPU of a particular user, as well as the IMPIs of the user devices that are associated with the IMPU of the particular user. For example, the IRS 118 of the user 120 may include an IMPU that is the MSISDN 122, and IMPIs may be the device identifiers (e.g., IMEIs) of the user devices 104(1)-104(3). The HSS 116 may also provide information about the physical locations of the network subscribers, such as the location of the user 120.

The CSCF node 114 may communicate with a telephony application server (TAS) 124 that resides in the core network 108. The TAS 124 may route voice and/or data communications within the mobile telecommunication network 102 and with other networks, including public switch telephone networks (PSTNs). For example, the TAS 124 may be a SIP application server that handles IP telephony for voice over LTE (VoLTE) services.

In various embodiments, the IMS core 112 may be equipped with a device association data store 126 that resides on one or more servers 128. The user 120 may provide user input to the device association data store 126 via a service portal 130, in which the portal is accessible through a computing device 132. The computing device 132 may be a laptop computer, a desktop computer, a tablet computer, or any other networked computing device that exchanges data with the one or more servers 128. The service portal 130 may be a subscriber website that is provided by the mobile telecommunication network 102 for subscribers of the mobile telecommunication network 102 to manage network, service, and/or device settings. Alternatively, the service portal 130 may be an internal customer care web or application interface for use by authorized customer care representative of the mobile telecommunication carrier. In such an alternative scenario, the customer care representative may input data into the service portal 130 on behalf of the user 120.

The service portal 130 may be provided by a web application or a server-side application that is hosted by the one or more servers 128. A user may use the service portal 130 to configure multiple user devices to initiate and receive communication via a single telephone number. For example, the service portal 130 may enable a user pull up a list of multiple user devices that have been pre-registered as being associated with the user in the HSS 116. Alternatively or concurrently, the service portal 130 may enable the user to register multiple user devices as being associated with the user. The service portal 130 may further provide a configuration interface that enables the user to designate one or more of such multiple user devices as being permitted to initiate and receive communication via a common telephone number. In various embodiments, the common telephone number may be a MSISDN, such as the MSISDN 122, that is associated with a line of service subscribed to by the user. The service portal 130 may use a user authentication mechanism to ensure that only authorized users are permitted to set up device associations. For example, the user authentication mechanism may validate a user as an authorized subscriber or authorized customer care representative of a mobile telecommunication carrier based on one or more user authentication credentials.

The device association data store 126 may store the user inputs from each user that configured one or more user devices of the user to be associated with a corresponding telephone number. Such device association data may be stored in one or more databases, such as relational databases, object databases, object-relational databases, and/or key-value databases of the device association data store 126. For example, the device association data store 126 may store the device associate profile 134 for the user 120. The CSCF node 114 may access the device association data stored in the device association data store 126. In various embodiments, the CSCF node 114 may use the device association data of a user to determine whether each of multiple user devices of the user is permitted to register with the mobile telecommunication network 102 to use a common telephone number. The successful registration of a user device may enable the user device to initiate and receive communications via the common telephone number.

For example, the user 120 may designate through the service portal 130 that the user devices 104(1) and 104(2) are permitted to initiate and receive communications through the MSISDN 122. However, the user 120 did not designate that the user device 104(3) is able to do so. Accordingly, the CSCF node 114 may register the user devices 104(1) and 104(2) as associated with the MSISDN 122 at device power up so that they may share in the use of MSISDN 122. However, the CSCF node 114 may deny the user device 104(3) registration to use the MSISDN 122. As a result, the user 120 is able to use the user devices 104(1) and 104(2) to communicate via the MSISDN 122, but not the user device 104(3).

The configuration of the CSCF node 114 to register multiple user devices to communicate through a common telephone number may relieve the TAS 124 from the duty of registering user devices with the core network 108 at device power up. In this way, the function of device registration with the mobile telecommunication network 102 for the purpose of serving user devices may be moved from the TAS 124 to the IMS core 112.

Example Call Flow

Figure 2:
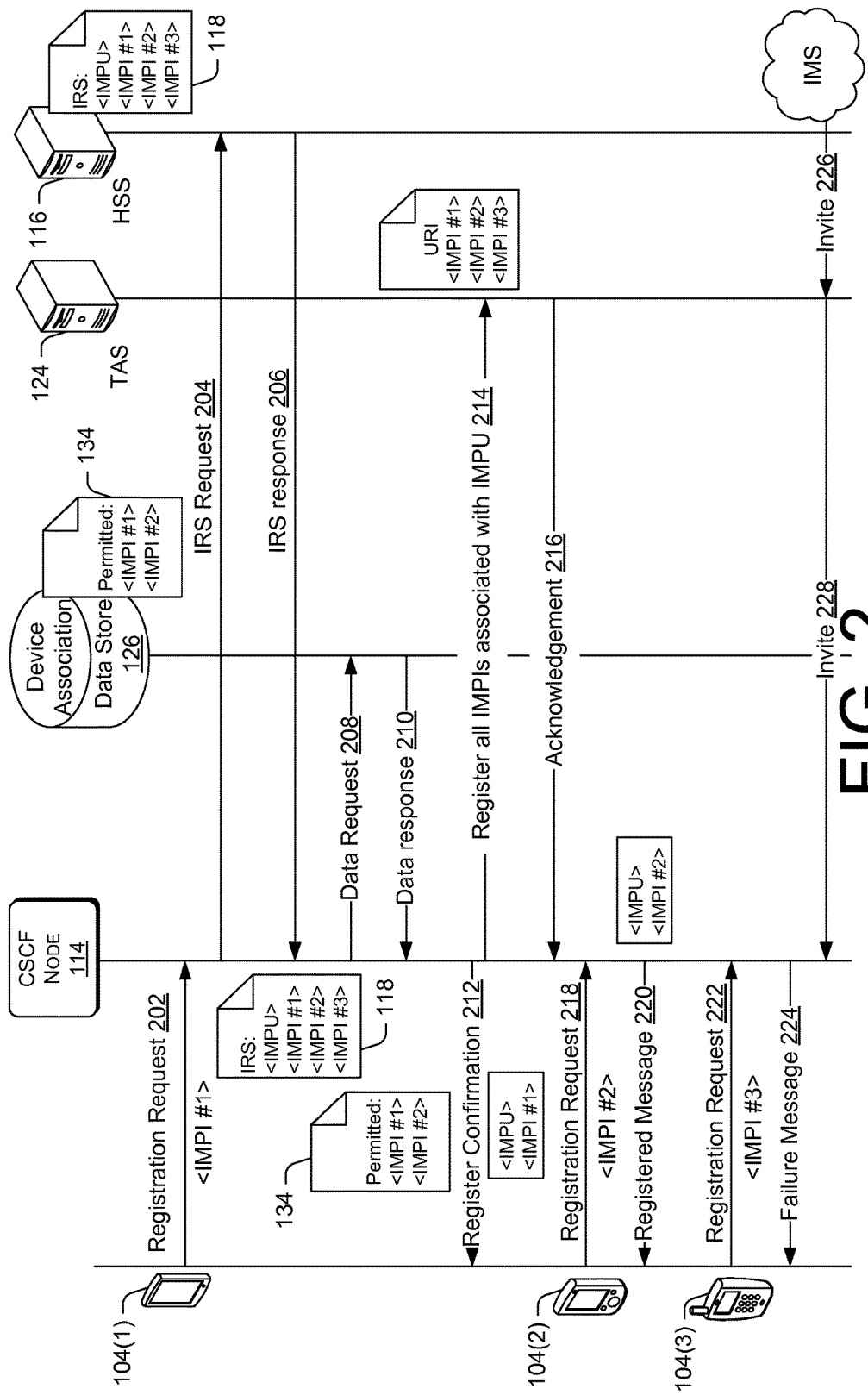
FIG. 2 is a block diagram showing an example call flow for implementing multiple device association with a single telephone number.

FIG. 2 is a block diagram showing an example call flow for implementing multiple device association with a single telephone number. This example call flow may involve the exchange of data between the user devices 104(1)-104(3), the CSCF node 114, the device association data store 126, and the HSS 116. The HSS 116 may store multiple IRSs for a plurality of users, including the IRS 118 for the user 120. Likewise, the device association data store 126 may store the device association data provided by multiple users, including the device association profile 134 of the user 120. For the purpose of this example call flow, the IRS 118 may store an IMPU of the user 120 in the form of the MSISDN 122, as well as IMPIs in the form of device identifiers, such as IMEIs, of the user devices 104(1)-104(3). Further, the device association profile 134 may indicate that the user 120 has permitted the user devices 104(1) and 104(2), with example "IMPI #1" and "IMPI #2" respectively, to initiate and receive communications via the MSISDN 122. However, the device association profile 134 may further indicate that the user device 104(3), with the example "IMPI #3" lacks such permission.

At step 202, the user device 104(1) may power up and send a device registration request to the CSCF node 114. The device registration request may be a SIP instance that includes a device identifier (e.g., IMEI) of the user device 104(1). However, in some alternative embodiments, the device registration may be a RADIUS instance. At step 204, the CSCF node 114 may send an IRS request for an IRS that is associated with the user device 104(1) to the HSS 116. In at least one embodiment, the IRS request may be a network authentication request that includes the device identifier of the user device 104(1). In various embodiments, the network authentication request may be a Cx Diameter request or a Simple Network Management Protocol (SNMP) request. Upon receiving the IRS request, the HSS 116 may locate the matching IRS 118 from among multiple stored IRSs using the device identifier of the user device 104(1).

Subsequently, at step 206, the HSS 116 may send the IRS 118 to the CSCF node 114 via an IRS response. In various embodiments, the IRS response may be a Cx Diameter response or a SNMP response. At step 208, the CSCF node 114 may send a data request for device association data that corresponds to the IMPU associated with the device identifier of the user device 104(1). The CSCF node 114 may send the data request to the device association data store 126. In various embodiments, the data request may be a Hypertext Transfer Protocol (HTTP) query or a Diameter query. Accordingly, a database management application of the device association data store 126 may locate the matching device association profile 134 based on the device identifier of the user device 104(1).

At step 210, the database management application of the device association data store 126 may send a data response that includes the device association profile 134 to the CSCF node 114. In at least one embodiment, the data response may be a HTTP query or a Diameter query. At step 212, the CSCF node 114 may examine the device association profile 134 to determine whether the user device 104(1) with the "IMPI #1" is permitted to be associated with the MSISDN 122. Since the device association profile 134 indicates that "IMPI #1" is permitted, the CSCF node 114 may register the user device 104(1) to initiate and receive communications via the MSISDN 122.

Subsequently, at step 212, the CSCF node 114 may send a registration confirmation to the user device 104(1). The registration confirmation may indicate to the user device 104(1) that it is able to use the MSISDN 122 to initiate and receive communications on the mobile telecommunication network 102. At step 214, the CSCF node 114 may send a registration message to the TAS 124 to register all the IMPIs associated with the IMPU. In other words, the CSCF node 114 may perform a third-party register with the P-associated identities and the SIP instance. In this way, the TAS 124 may store a uniform resource identifier (URI) for the IMPIs that enables the TAS 124 to route communications for the MSISDN 122 through the CSCF node 114. Once the registration with the TAS 124 is complete, the TAS 124 may send an acknowledgement message to the CSCF node 114 at step 216.

At step 218, the user device 104(2) may power up and send a device registration request to the CSCF node 114. The device registration request may be a SIP instance that includes a device identifier (e.g., IMEI) of the user device 104(2). Upon receive the device registration request, the CSCF node 114 may use the device identifier of the user device 104(2) to determine that the device belongs to the IRS 118. The CSCF node 114 may further determine that the device association profile 134 is already available for the user device 104(2) at the node. Thus, the CSCF node 114 may examine the device association profile 134 that was previously obtained from the device association data store 126. Accordingly, the CSCF node 114 may determine whether the user device 104(2) with the "IMPI #2" is permitted to be associated with the MSISDN 122. Since the device association profile 134 indicates that "IMPI #2" is permitted, the CSCF node 114 may register the user device 104(2) to initiate and receive communications via the MSISDN 122. Subsequently, at step 220, the CSCF node 114 may send a registration confirmation to the user device 104(2). The registration confirmation may indicate to the user device 104(2) that it is able to use the MSISDN 122 to initiate and receive communications on the mobile telecommunication network 102.

At step 222, the user device 104(3) may power up and send a device registration request to the CSCF node 114. The device registration request may be a SIP instance that includes a device identifier (e.g., IMEI) of the user device 104(3). Upon receive the device registration request, the CSCF node 114 may use the device identifier of the user device 104(3) to determine that the device belongs to the IRS 118. The CSCF node 114 may further determine that the device association profile 134 is already available for the user device 104(3) at the node. Thus, the CSCF node 114 may examine the device association profile 134 that was previously obtained from the device association data store 126. Accordingly, the CSCF node 114 may determine whether the user device 104(3) with the "IMPI #3" is permitted to be associated with the MSISDN 122. In this case, the device association profile 134 does not indicate that "IMPI #3" is permitted. As a result, the CSCF node 114 may deny the user device 104(3) the ability to initiate and receive communications via the MSISDN 122. Subsequently, at step 224, the CSCF node 114 may send a registration failure message to the user device 104(3). The registration failure message may indicate to the user device 104(3) that the registration of the user device 104(3) is prohibited by user configuration.

At step 226, the TAS 124 may receive an invite for an incoming communication from an IMS core. The IMS core may be the IMS core 112, or the IMS core of a different mobile telecommunication network. For example, the incoming communication may be a voice call, a text message, a multimedia message, or so forth that originated from a sender. The incoming communication is directed to the IMPU of the user 120, which may be the MSISDN 122. Thus, at step 228, the TAS 124 may pass the invite to the CSCF node 114. Upon receiving the invite for the incoming communication, the CSCF node 114 may consult the device association profile 134 and determine that the user devices 104(1) and 104(2), but not the user device 104(3), is to be alerted of the incoming communication. In other embodiments, the CSCF node 114 may send communications that originate from registered user devices, such as the user devices 104(1) and 104(2), to the TAS 124. The TAS 124 may then route each communication to a recipient user device on the IMS core 112 or an IMS core of a different network.

Example Computing Device Components

Figure 3:
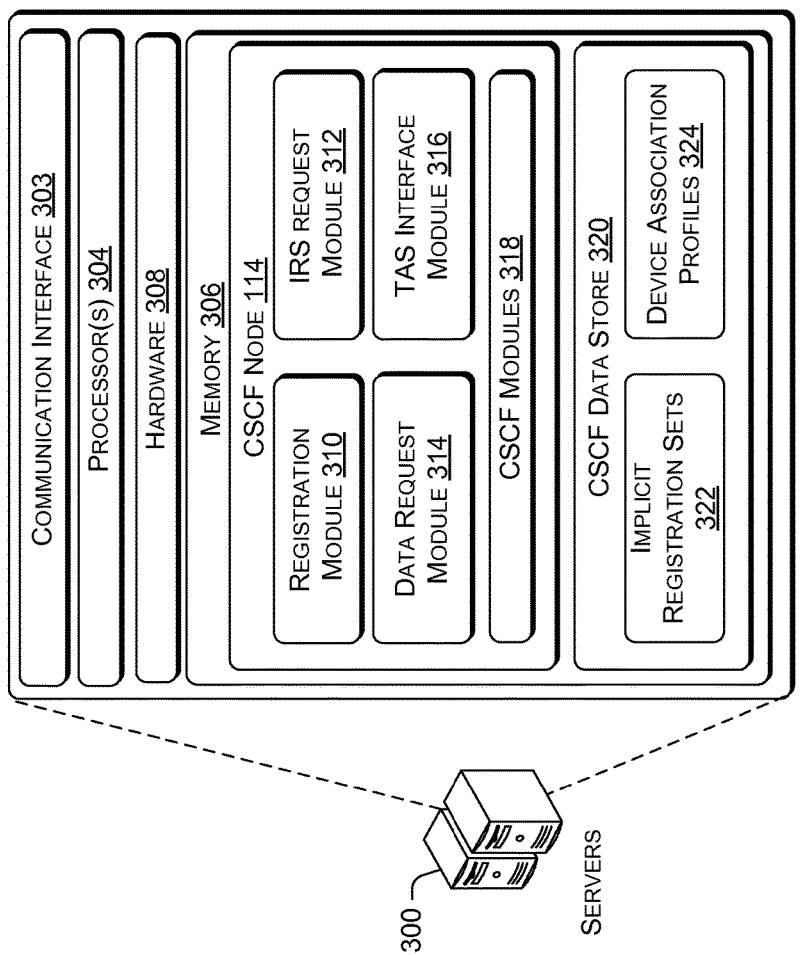
FIG. 3 is a block diagram showing various components of a call session control function (CSCF) node that implements multiple device association with a single telephone number.

FIG. 3 is a block diagram showing various components of a call session control function (CSCF) node that implements multiple device association with a single telephone number. The CSCF node 114 may be provided by one or more servers 300. The servers 300 may include a communication interface 302, one or more processors 304, memory 306, and hardware 308. The communication interface 302 may include wireless and/or wired communication components that enable the servers 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the servers 300 may implement the CSCF node 114. In turn, the CSCF node 114 may execute a registration module 310, an IRS request module 312, a data request module 314, and a TAS interface module 316. The modules may include routines, program instructions, objects, and/or data structures that perform particular tasks or implement particular abstract data types. The registration module 310 may be responsible for receiving device registration requests from user devices and either grant or deny the device registration requests of the user devices. Accordingly, the registration module 310 may send responses that indicate whether registration of each user device with the mobile telecommunication network 102 to use a telephone number succeeded or failed.

The registration module 310 may further check device association entries and IRSs in order to determine whether a device registration request from a user device is to be granted or denied.

The IRS request module 312 may be used by the registration module 310 to interface with the HSS 116 for the purpose of obtaining IRSs that are relevant to user devices. In various embodiments, the IRS request module 312 may send IRS requests to the HSS 116, and receive IRS for user devices in return. In some embodiments, the IRS request module 312 may periodically resend, or resend upon user demand, IRS requests to receive updated versions of the IRSs from the HSS 116. The data request module 314 may be used by the CSCF node 114 to request and obtain device association data, such as the device association profile 134, from the device association data store 126. In various embodiments, the data request module 314 may send HTTP or Diameter requests, and receive the device association profiles via HTTP or Diameter responses from a database management application of the device association data store 126. In some embodiments, the data request module 314 may periodically resend, or resend upon user demand, device association data requests to receive updated versions of the device association profiles from the HSS 116.

The TAS interface module 316 may send registration messages to the TAS 124 to register all the IMPIs associated with the IMPU of each user, such that the associated user devices of each user may initiate and receive communications through the TAS 124. In some embodiments, the TAS interface module 316 may automatically resend a registration message for an IMPU when a corresponding IRS is received by the IRS request module 312. The CSCF node 114 may include one or more additional CSCF modules 318 that perform other tasks that are handled by the CSCF node 114. These tasks may include typical network duties that are performed by the S-CSCF, the I-CSCF, and/or so forth.

The CSCF node 114 may store data in a CSCF data store 320. The data store may include one or more databases, such as relational databases, object databases, object-relational databases, and/or key-value databases. The data stored in the CSCF data store 320 may include IRS 322 of multiple users as received from the HSS 116, and device association profiles 324 of multiple users as received from the device association data store 126.

Example Processes

Figure 4:
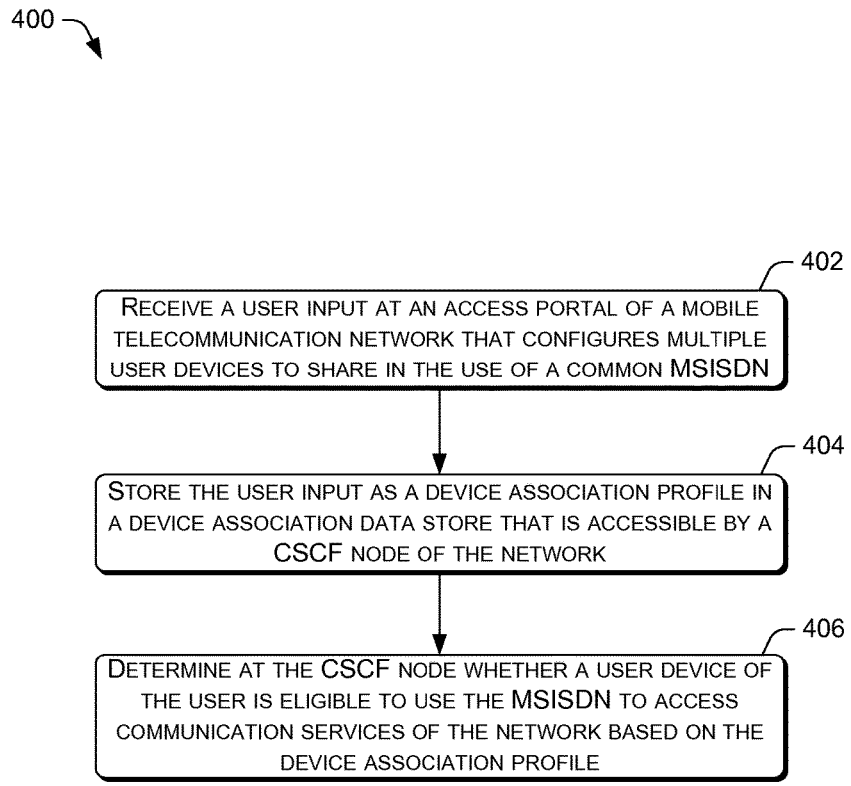
FIG. 4 is a flow diagram of an example process for selectively associating multiple devices with a single telephone number based on user configuration for accessing communication services provided by a mobile telecommunication network.
Figure 5:
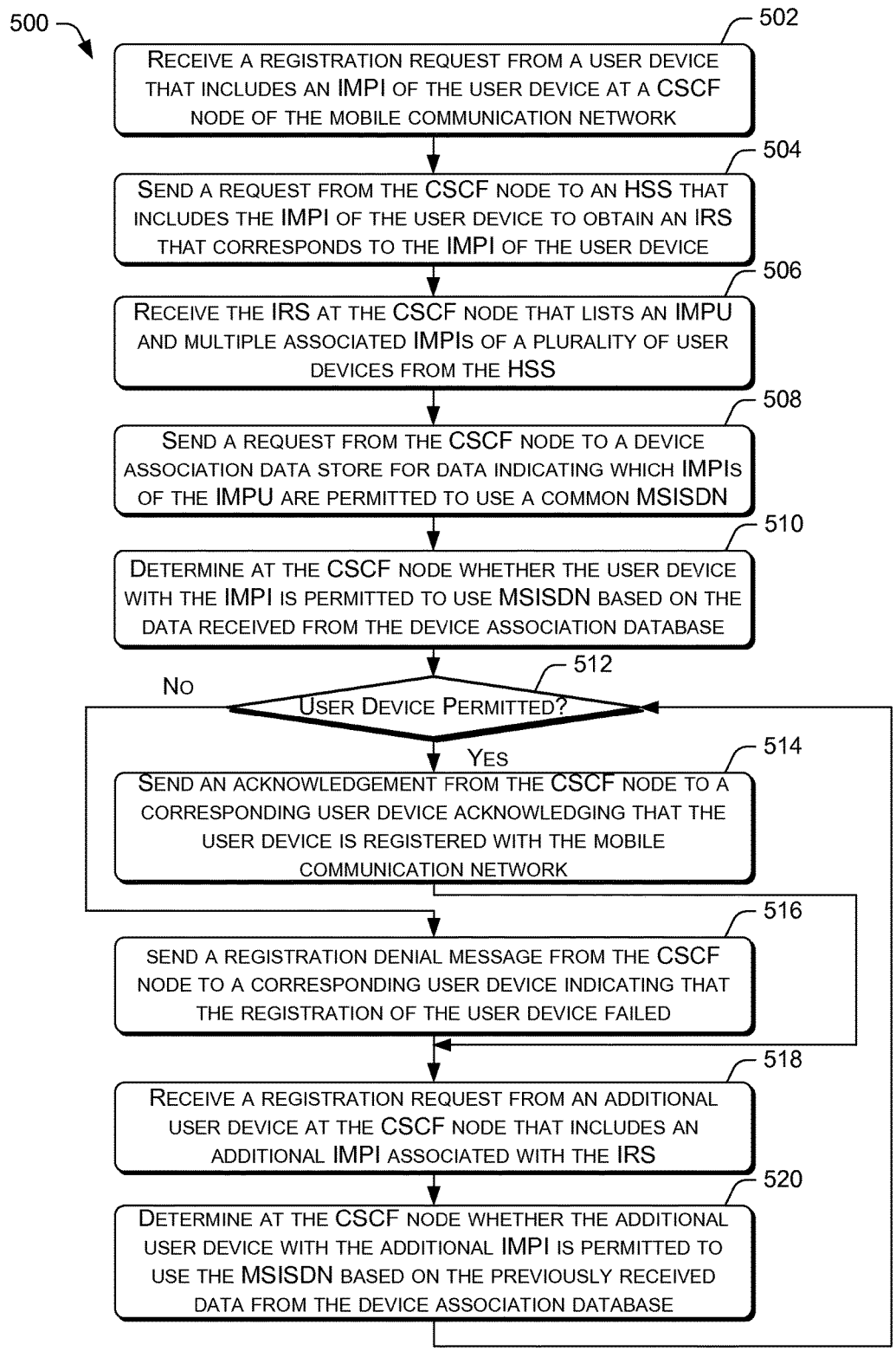
FIG. 5 is a flow diagram of an example process for selectively registering user devices with a CSCF node of the mobile telecommunication network based on a device association profile.
Figure 6:
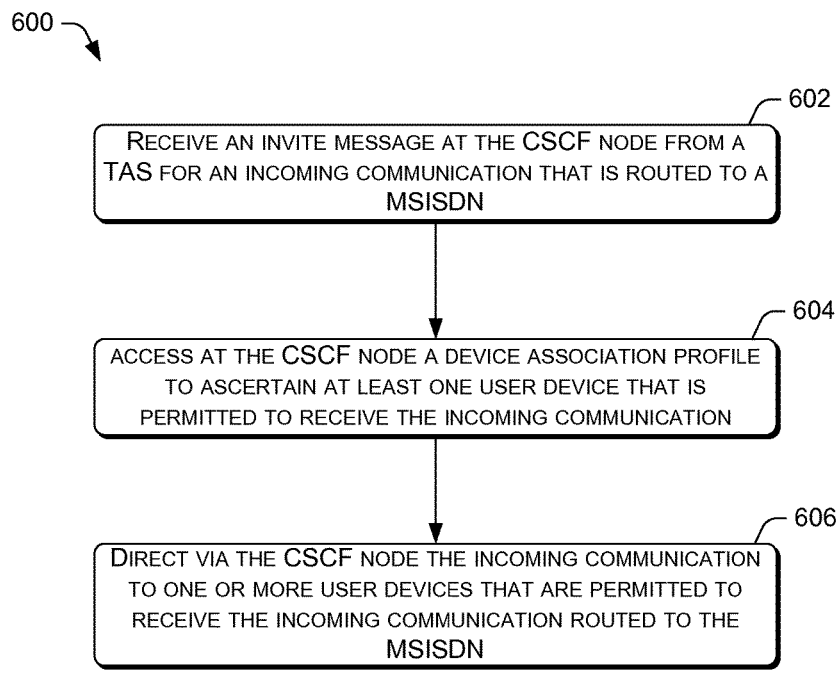
FIG. 6 is a flow diagram of an example process for a CSCF node to direct an incoming communication to one or more user devices with registered IP multimedia private identities.

FIGS. 4-6 present illustrative processes 400-600 for implementing multiple device association with a single telephone number. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 400-600 are described with reference to the architecture 100 of FIG. 1.

FIG. 4 is a flow diagram of an example process 400 for selectively associating multiple devices with a single telephone number based on user configuration for accessing communication services provided by a mobile telecommunication network. At block 402, the mobile telecommunication network 102 may receive a user input at the service portal 130 that configures multiple user devices to share in the use of a common telephone number, such as a MSISDN. The single telephone number may be for a line of service that enables the user to use communication services provided by the mobile telecommunication network 102. Each of the multiple devices may be a SIM-equipped device or a non-SIM device that are under the control of the user. In various embodiments, each user device is identified by an IMPI that is associated with an IMPU that is stored in the HSS 116. Accordingly, the multiple devices may be configured by designating an IMPI of each user device as being associated with the common telephone number.

At block 404, the mobile telecommunication network 102 may store the user input as a device association profile in the device association data store 126. The device association data store 126 may be accessible by the CSCF node 114 of the mobile telecommunication network 102. For example, the device association profile 134 that is generated for the user 120 may indicate that the user 120 configured the user devices 104(1) and 104(2) to be associated with the MSISDN 122. However, the device association profile 134 may indicate that the user device 104(3) is not associated with the MSISDN 122.

At block 406, the CSCF node 114 of the mobile telecommunication network 102 may access the device association profile from the device association data store 126. Accordingly, the CSCF node 114 may determine whether a user device of the user is eligible to use the common telephone number to access the communication services provided by the mobile telecommunication network 102 via the common telephone number. In the example described above, if the user device is the user device 104(1) or the user device 104(2), the CSCF node 114 may permit the user device to be registered for initiating and receiving communications via the MSISDN 122. However, if the user device is the user device 104(3), the CSCF node 114 may deny the registration request.

FIG. 5 is a flow diagram of an example process 500 for selectively registering user devices with a CSCF node of the mobile telecommunication network based on a device association profile. The process 500 further illustrates block 406 of the process 400. At block 502, the CSCF node 114 may receive a device registration request from a user device, in which the device registration request may include an IMPI of the user device. The device registration request may be initiated by the user device upon power up of the user device. In various embodiments, the IMPI may be an IMEI, a MEID, or some other ESN of the user device.

At block 504, the CSCF node 114 may send an IRS request to the HSS 116 that includes the IMPI of the user device. Upon receiving the IRS request, the HSS 116 may locate the matching IRS 118 from among multiple IRSs using the IMPI of the user device 104(1). At block 506, the CSCF node 114 may receive the IRS, which may list an IMPU, as well as multiple IMPIs of a plurality of user devices that are associated with the IMPU.

At block 508, the CSCF node 114 may send a request to the device association data store 126 for device association data. The request may include the IMPU that is associated with the user device. The device association data may indicate which IMPIs of the IMPU are permitted to use a common telephone number, i.e., a common MSISDN. The telephone number may belong to a line of service that enables the user to use communication services provided by the mobile telecommunication network 102.

At block 510, the CSCF node 114 may determine whether the user device with the IMPI is permitted to use the MSISDN based on the device association data received from the device association data store 126. The device association data may be in the form of a device association profile that corresponds to the IMPI. The device association profile may contain device association entries that indicate whether the user device is permitted to use the MSISDN.

At decision block 512, if the CSCF node 114 determines that the user device is permitted ("yes" at decision block 512), the process 500 may proceed to block 514. At block 514, the CSCF node 114 may register the user device with the mobile telecommunication network 102 to initiate and receive communications via the MSISDN. Subsequently, the CSCF node 114 may send an acknowledgement to the user device acknowledging that the user device is registered with the mobile telecommunication network 102. Further, the CSCF node 114 may send a registration message to the TAS 124 to register all the IMPIs associated with the IMPU.

However, if the CSCF node 114 determines that the user device is not permitted ("no" at decision block 512), the process 500 may proceed to block 516. At block 516, the CSCF node 114 may deny the user device the registration that provides the ability to initiate and receive communications via the MSISDN. Subsequently, the CSCF node 114 may send a registration denial message to the user device indicating that the registration of the user device failed. Further, the CSCF node 114 may send a registration message to the TAS 124 to register all the IMPIs associated with the IMPU.

At block 518, the CSCF node 114 may receive a device registration request from an additional user device, in which the device registration request may include an additional IMPI that is associated with the IRS that was previously received for the user device. The device registration request may be initiated by the additional user device upon power up of the additional user device. Accordingly, the CSCF node 114 may determine whether the additional user device with the additional IMPI is permitted to use the MSISDN based on the previously received data, i.e., the device association profile, from the device association data store 126. Accordingly, returning to decision block 512, if the CSCF node 114 determines that the additional user device is permitted ("yes" at decision block 512), the process 500 may once again proceed to block 514. However, if the CSCF node 114 determines that the additional user device is not permitted ("no" at decision block 512), the process 500 may once again proceed to block 516.

FIG. 6 is a flow diagram of an example process 600 for a CSCF node to direct an incoming communication to one or more user devices with registered IP multimedia private identities. At block 602, the CSCF node 114 may receive an invite message from the TAS 124 for an incoming communication that is route to a MSISDN. In various embodiments, the invite may be from IMS core 112, or the IMS core of a different mobile telecommunication network. The incoming communication may be a voice call, a text message, a multimedia message, or so forth.

At block 604, the CSCF node 114 may access a device association profile to ascertain at least one device that is permitted to receive the incoming communication. In various embodiments, the CSCF node 114 may identify the device association profile to access by matching the MSISDN of the incoming communication to the IMPU of the device association profile. The device association profile may be in a data store of the CSCF node 114 or retrieved by the CSCF node 114 from the device association data store 126.

At block 606, the CSCF node 114 may direct the incoming communication to the one or more user devices that are permitted to receive the incoming communication route to the MSISDN. For example, the device association profile 134 may indicate that user devices 104(1) and 104(2) are permitted to receive the incoming communication, but user device 104(3) does not have permission. Accordingly, the CSCF node 114 may route the incoming communication to the user devices 104(1) and 104(2), but not user device 104(3).

The ability to associate multiple user devices with a single telephone number may enable a user to initiate and receive communication via a single telephone number from any of the multiple user devices. Such ability may provide additional convenience to the user of the multiple user devices. For example, if the user inadvertently leaves a mobile telecommunication device at home while traveling abroad, the user may still initiate and receive communication at the same telephone number using a different device without purchasing another SIM card or order another line of service from an existing mobile telecommunication carrier. In another example, a user that desires to use different user devices for different events and occasions while using the same telephone number may do so without having to seek assistance from customer care or swap a SIM card between the different user devices.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising: receiving an input at a service portal of a mobile telecommunication network, the input for configuring a call session control function (CSCF) node to concurrently register multiple user devices to use a common telephone number to initiate and receive communications via the mobile telecommunication network; storing the input as a device association profile in a device association data store that is accessible by the CSCF node of the mobile telecommunication network, the device association profile including multiple IP Multimedia Private Identities (IMPIs) of the multiple user devices that are permitted to use the common telephone number; receiving the device association profile at the CSCF node from the device association data store; determining at the CSCF node based at least on the device association profile whether a user device is eligible to use the common telephone number to initiate and receive communications via the mobile telecommunication network; and in response to determining that the device association profile indicates that an IMPI of the user device is permitted to use the common telephone number, registering the user device to initiate and receive communications through the common telephone number via the CSCF node.

2. The computer-implemented method of claim 1, further comprising: receiving a registration request from the user device that includes the IMPI of the user device at the CSCF node; sending a request from the CSCF node to a Home Subscriber Server (HSS) of the mobile telecommunication network that includes the IMPI of the user device to obtain an Implicit Registration Set (IRS) that corresponds to the IMPI of the user device; and receiving the IRS at the CSCF node from the HSS, the IRS listing an IP Multimedia Public Identity (IMPU) and multiple associated IMPIs of a plurality of user devices that include the IMPI of the user device.

3. The computer-implemented method of claim 2, further comprising registering the IMPU and the multiple associated IMPIs of the plurality of user devices at a Telephony Application Server (TAS) of the mobile telecommunication network to enable the TAS to send communications for the common telephone number to the CSCF node for routing to each user device that shares the common telephone number.

4. The computer-implemented method of claim 3, further comprising:
receiving at the CSCF node an invite message from the TAS, the invite message for an incoming communication that is routed to the common telephone number;
access at the CSCF node the device association profile to ascertain one or more user devices that are permitted to receive the incoming communication routed to the common telephone number; and
directing via the CSCF node the incoming communication to the one or more user devices that are permitted to receive the incoming communication routed to the common telephone number.

5. The computer-implemented method of claim 2, wherein the receiving the device association profile includes receiving the device association profile in response to the CSCF node sending a data request that includes the IMPU associated with the user device to the device association data store.

6. The computer-implemented method of claim 1, further comprising sending a registration acknowledgement from the CSCF node to the user device in response to the determining that the device association profile indicates that the IMPI of the user device is permitted to use the common telephone number.

7. The computer-implemented method of claim 1, further comprising sending a registration denial message from the CSCF node to the user device in response to determining the device association profile indicates that the IMPI of the user device is not permitted to use the common telephone number.

8. The computer-implemented method of claim 1, further comprising: receiving an additional registration request from an additional user device that includes an additional IMPI of the additional user device at the CSCF node; registering the additional user device to initiate and receive communications through the common telephone number via the CSCF node in response to determining that the device association profile as previously received from the device association data store indicates that the additional IMPI of the additional user device is permitted to use the common telephone number; and sending a registration denial message from the CSCF node to the additional user device in response to determining the device association profile indicates that the additional IMPI of the additional user device is not permitted to use the common telephone number.

9. The computer-implemented method of claim 1, wherein the IMPI of the user device is an International Mobile Station Equipment Identity (IMEI), a Mobile Equipment Identifier (MEID), or another electronic serial number (ESN) of the user device.

10. The computer-implemented method of claim 1, wherein the multiple user devices include a Subscriber Identity Module (SIM)-equipped mobile telecommunication device.

11. One or more non-transitory computer-readable media of a mobile telecommunication network storing computer-executable instructions that upon execution cause one or more processors to perform acts comprising: determining at a call session control function (CSCF) node, based at least on a device association profile, whether a user device is eligible to use a common telephone number to initiate and receive communications via the mobile telecommunication network, the device association profile for configuring the CSCF node to concurrently registering IP Multimedia Private Identities (IMPIs) of multiple user devices such that the multiple user devices use a common telephone number to initiate and receive communications via the mobile telecommunication network; registering the user device via the CSCF node to initiate and receive communications through the common telephone number in response to determining the device association profile indicates that the user device is permitted to use the common telephone number; and sending a registration denial message from the CSCF node to the user device in response to determining the device association profile indicates that the user device is not permitted to use the common telephone number; and
registering an IP Multimedia Public Identity (IMPU) and multiple associated IP IMPIs of a plurality of user devices at a Telephony Application Server (TAS) of the mobile telecommunication network to enable the TAS to send communications for the common telephone number to the CSCF node for routing to each user device that shares the common telephone number.

12. The one or more non-transitory computer-readable media of claim 11, further comprising: receiving a registration request from the user device that includes an IP Multimedia Private Identity (IMPI) of the user device at the CSCF node; sending a request from the CSCF node to a home subscriber information database of the mobile telecommunication network that includes the IMPI of the user device to obtain an Implicit Registration Set (IRS) that corresponds to the IMPI of the user device; receiving the IRS at the CSCF node from the home subscriber information database, the IRS listing the IP Multimedia Public Identity (IMPU) and the multiple associated IMPIs of the plurality of user devices; and receiving the device association profile at the CSCF node from a device association data store in response to the CSCF node sending a data request that includes the IMPU associated with the user device to the device association data store.

13. The one or more non-transitory computer-readable media of claim 12, wherein the device association profile is stored in the device association data store based at least on input received at a web portal provided by the mobile telecommunication network.

14. The one or more non-transitory computer-readable media of claim 11, further comprising: receiving at the CSCF node an invite message from the TAS, the invite message for an incoming communication that is routed to the common telephone number; access at the CSCF node the device association profile to ascertain one or more user devices that are permitted to receive the incoming communication routed to the common telephone number; and directing via the CSCF node the incoming communication to the one or more user devices that are permitted to receive the incoming communication routed to the common telephone number.

15. The one or more non-transitory computer-readable media of claim 11, further comprising sending a registration acknowledgement from the CSCF node to the user device in response to determining the device association profile indicates that the user device is permitted to use the common telephone number.

16. The one or more non-transitory computer-readable media of claim 11, wherein the device association profile includes eligible IP Multimedia Private Identities (IMPIs) of user devices that are permitted to initiate and receive communications via the common telephone number, and wherein the determining includes determining that the user device is permitted when an IP Multimedia Private Identity (IMPI) of the user device matches an eligible IMPI in the device association profile.

17. The one or more non-transitory computer-readable media of claim 11, wherein the communications include voice calls, text messages, multimedia messages, web data transfers, or network data transfers.

18. One or more servers of a call session control function (CSCF) node on a mobile telecommunication network, comprising: one or more processors; and memory having instructions stored therein, the instructions, when executed by the one or more processors, cause the one or more processors to perform acts comprising: receiving, at the CSCF node, a device association profile from a device association data store of the mobile telecommunication network, the device association profile for configuring the CSCF node to concurrently register IP Multimedia Private Identities (IMPIs) of multiple user devices such that the multiple user devices use a common telephone number to initiate and receive communications via the mobile telecommunication network; determining at the CSCF node, based at least on the device association profile, whether a user device is eligible to use the common telephone number to initiate and receive communications via the mobile telecommunication network; registering the user device via the CSCF node to initiate and receive communications through the common telephone number in response to determining the device association profile indicates that the user device is permitted to use the common telephone number; sending a registration denial message from the CSCF node to the user device in response to determining the device association profile indicates that the user device is not permitted to use the common telephone number; and registering an IP Multimedia Public Identity (IMPU) and multiple associated IMPIs of a plurality of user devices at a Telephony Application Server (TAS) of the mobile telecommunication network to enable the TAS to send communications for the common telephone number to the CSCF node for routing to each user device that shares the common telephone number.

19. The one or more servers of claim 18, wherein the acts further comprise: receiving a registration request from the user device that includes an IP Multimedia Private Identity (IMPI) of the user device at the CSCF node; sending a request from the CSCF node to a home subscriber information database of the mobile telecommunication network that includes the IMPI of the user device to obtain an Implicit Registration Set (IRS) that corresponds to the IMPI of the user device; and receiving the IRS at the CSCF node from the home subscriber information database, the IRS listing the IP Multimedia Public Identity (IMPU) and the multiple associated IMPIs of the plurality of user devices.

20. The one or more servers of claim 18, wherein the receiving includes receiving the device association profile at the CSCF node in response to the CSCF node sending a data request that includes the IMPU associated with the user device to the device association data store.

* * * * *